United States Patent [19]

Wendel

[11] 4,108,159
[45] Aug. 22, 1978

[54] SOLAR COLLECTOR

[75] Inventor: Ion L. Wendel, St. Petersburg, Fla.

[73] Assignee: James L. Lowe, St. Petersburg, Fla.

[21] Appl. No.: 797,468

[22] Filed: May 16, 1977

Related U.S. Application Data

[63] Continuation-in-part of Ser. No. 596,513, Jul. 16, 1975, abandoned.

[51] Int. Cl.² ............................................. F24J 3/02
[52] U.S. Cl. ................................................. 126/271
[58] Field of Search ................ 126/270, 271; 312/284; 206/45.22, 45.34

[56] References Cited

U.S. PATENT DOCUMENTS

| | | | |
|---|---|---|---|
| 3,307,603 | 3/1967 | Swett | 312/284 |
| 3,399,664 | 9/1968 | Suhay | 126/271 |
| 3,521,414 | 7/1970 | Malissa | 52/200 |
| 3,898,979 | 8/1975 | Medico, Jr. | 126/271 |
| 3,902,794 | 9/1975 | Abrams | 350/294 |
| 3,952,725 | 4/1976 | Edmondson | 126/271 |
| 3,961,619 | 6/1976 | Estes et al. | 126/271 |
| 3,965,887 | 6/1976 | Gramer et al. | 126/271 |

*Primary Examiner*—Lloyd L. King

*Attorney, Agent, or Firm*—William E. Mouzavires

[57] ABSTRACT

A solar collector has a galvanized steel, inverted heat pan having a flat plate top and depending sides encasing the sides of typical insulation along the bottom of the plates. A continuous copper tube on the upper face of the plate is of generally serpentine configuration with ends of adjacent runs connected by return bends. The runs are slightly inclined horizontally so that any moisture collecting on the plate flows to the bottom of the normally inclined plate and is discharged. Also, cool water entering at the bottom of the tube moves upwardly through the inclined runs as it is heated, and through an outlet at the top of the tube. Lead strips are preferably provided between the copper tube and the galvanized plate to prevent deterioration by electrolysis between the tube and the plate. A transparent dome has sides which overlap the plate sides and are secured thereto in a manner permitting passage of air into and out of the dome and thus maintain substantially atmospheric pressure within the dome. The transparent sides and beveled side edges of the dome permit greater exposure of the heat plate to solar energy during early and late daylight hours.

21 Claims, 4 Drawing Figures

SOLAR COLLECTOR

This invention relates to a solar collector and, more particularly, to a flat plate collector, and to features thereof, and is a continuation-in-part of my copending application Ser. No. 596,513, filed July 16, 1975, now abandoned.

BACKGROUND OF THE INVENTION

Contemporary flat plate type solar collectors generally include a wooden or metal frame which receives a heat pan having a flat plate with tube means on its top face for fluid to be heated by solar energy, an insulation along the bottom of the plate. The upper edge portion of the frame normally receives a pane of transparent glass, or equivalent material, which is glazed along the frame. Should the glazing develop leaks, water or snow may enter the collector. Unless the collector is suitably vented, pressure variations in the chamber between the glass and the heat pan may be troublesome. Additionally, the portion of the frame above the heat pan reduces the amount of solar energy reaching the pan during early morning and late afternoon hours when the sun is relatively low.

While it is common practice to provide contempory solar collectors with opaque side walls, thus cutting down the solar energy reaching the pan and its tubes during early and late daylight hours, a patent granted in 1913, U.S. Pat. No. 1,068,650, shows a solar water heater including a boiler encased in a generally cylindrical glass cover so that early and late sunlight could heat the boiler. A patent granted in 1940, U.S. Pat. No. 2,213,894, shows a solar collector having a conical tube encased between an insulated base and a transparent, double wall hemispherical cover which is seated in concentric grooves in the base. Neither of the foregoing collectors are of the flat plate type. U.S. Pat. No. 2,907,318, shows a solar collector having transparent side walls and cover, but other features of this collector would retard early and late sunlight from being effective in heating the collector. Another solar collector is shown in U.S. Pat. No. 3,000,375, and has a vacuum chamber which probably has transparent side walls, but this feature is not discussed in the patent. A somewhat dome-shaped, clear plastic cover is shown in U.S. Pat. No. 3,595,216, but is received within encasing flanges of a solar collector and would leave something to be desired in preventing entry of water or snow within the cover. In FIG. 6 of U.S. Pat. No. 3,875,925, a generally dome-shaped transparent cover is provided, but this cover and other portions of the solar collector are inflated by a blower, and weather proofing of the collector appears to be inadequate.

Various display signs use generally dome-shaped transparent covers with an outwardly directed flange along the rim of the dome for securing the cover in place on the remainder of the sign, and are somewhat similar to the cover of the present solar collector.

BRIEF SUMMARY OF THE INVENTION

The invention, in brief, is directed to a solar collector and, more particularly, to a flat plate type solar collector, and to particular features and sub-combinations thereof. The solar collector has an inverted heat pan with an upper face carrying tube means for fluid to be heated and this face is unobstructed by side walls. Depending side walls along the periphery of the plate encase insulation along the lower face of the pan. The tube means along the upper face of the plate have inclined runs for permitting moisture collecting on the normally inclined pan to flow to a bottom portion thereof and to permit fluid in the tube means to rise upwardly as it is heated. A dome-shaped transparent cover has beveled side edges for better penetration by the sun, and has peripheral side walls which encircle the sides of the pan and are secured thereto, and also retain the insulation in place, the cover side walls normally effectively preventing the entry of rain or snow between the plate and the cover, while permitting substantially atmospheric pressure in the chamber between the plate and the cover. Resilient pads on the tube runs prevent the cover from being deflected too far inwardly. A galvanized steel pan is preferably provided to reduce cost, and the tubing is preferably copper and is separated from the pan by lead strips to prevent electrolysis and resultant deterioration. The collectors may be of any desired size, for example, from 1'×1', to 12'×12' and larger.

It is a primary object of this invention to provide a new and useful solar collector.

Another object is provision of a new and useful solar collector which is efficient in operation and substantially weatherproof, and is of simple and inexpensive construction.

Still another object is provision of a new and useful solar collector having features readily adaptable to mass production.

A further object is provision of a new and useful solar collector with a heat plate having depending side walls encasing insulation along the bottom of the plate, and a transparent dome-shaped cover encasing the plate side walls and effectively preventing the entry of rain or snow while permitting the suns rays earlier and later access to the plate, the cover having beveled side edges for increasing the efficiency of the solar collector. A related object is provision of tube means on the upper face of the heat plate, which is normally inclined, with tube runs slightly inclined across the face of the plate and to adjacent runs, to permit drainage of moisture toward the bottom portion of the plate and to permit free flow of a heated fluid within the tube means from a bottom inlet to an upper outlet. Another related object is provision of bumpers on the tube runs to prevent excessive deflection of the cover.

Another object of this invention is provision of a new and useful heat plate having an upper face and depending side walls adapted to encase insulation along the lower face of the plate. A related object is provision therein of unobstructed edge portions of the upper face of the plate to permit the sun's rays earlier and later access to the upper face. Another related object is provision of a fluid carrying tube having runs inclined across the upper face of the plate and to adjacent runs, for passage of moisture downwardly along the normally inclined plate and for passage of fluid upwardly in the tube as the fluid is heated by the solar energy. Another related object is provision of such a heat plate which is adapted to receive a transparent cover having side walls embracing plate sides.

A further object is provision of a new and improved transparent solar collector cover which is dome-shaped with depending sides for access of solar energy earlier and later in the day. A related object is provision of such a cover having beveled side edges for better ingress of solar energy. Another related object is provision of such a cover as an integral unit, such as a molded or stamped cover and preferably devoid of seams or other connections.

Additional objects and advantages of the invention will be apparent from the following description and the accompanying drawing.

DESCRIPTION OF THE ILLUSTRATED EMBODIMENT

Figure 1:
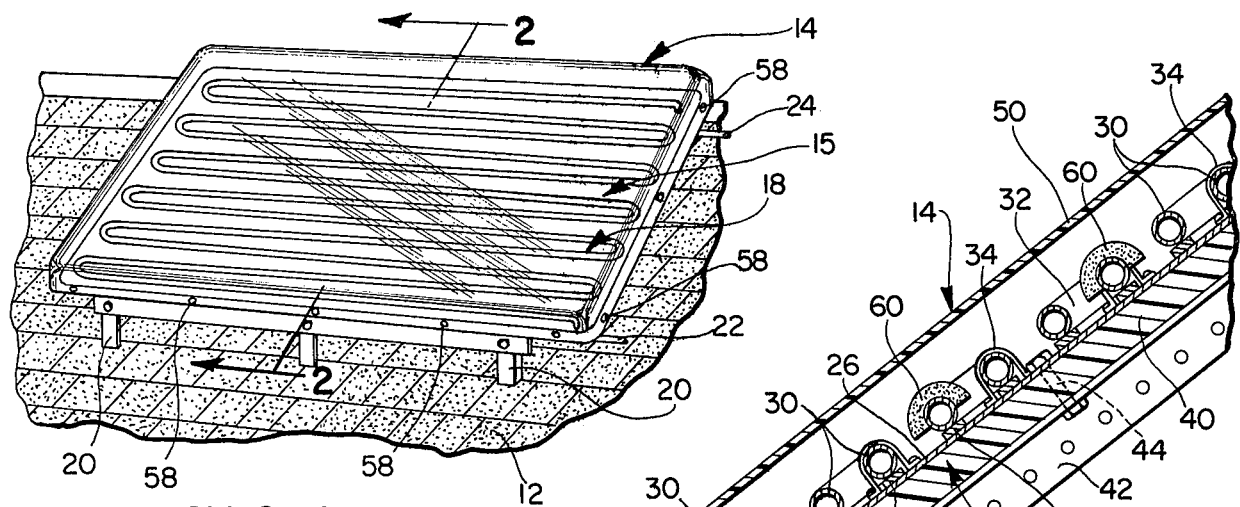
FIG. 1 is a fragmentary, schematic, perspective view of a preferred embodiment of the invention in the form of a solar collector installed on a pitched roof.

The invention is illustrated in FIG. 1 in the form of a flat plate solar collector 10 mounted on a pitched roof 12. Solar collector 10 includes a plexiglass dome-shaped cover 14 over a base illustrated in the drawings in the form of an inverted heat pan 15 having a generally flat top plate 16 with a continuous tube 18 thereon. Legs 20 are secured to the under side of the inverted pan 15 to mount the solar collector 10 on the pitched roof 12, as will be more fully described hereinafter. In typical manner, solar collector 10 is inclined to obtain maximum exposure to the sun. An inlet 22 into the tube 18 for fluid to be heated is provided at the lower right hand corner of the collector 10, and an outlet 24 for heated fluid is provided at the upper right hand corner of the collector.

Figure 2:
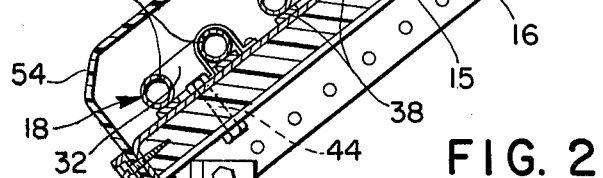
FIG. 2 is an enlarged, fragmentary, schematic, sectional elevational view, taken generally along the line 2—2 in FIG. 1, but with the collector removed from the roof for clearer illustration.
Figure 4:
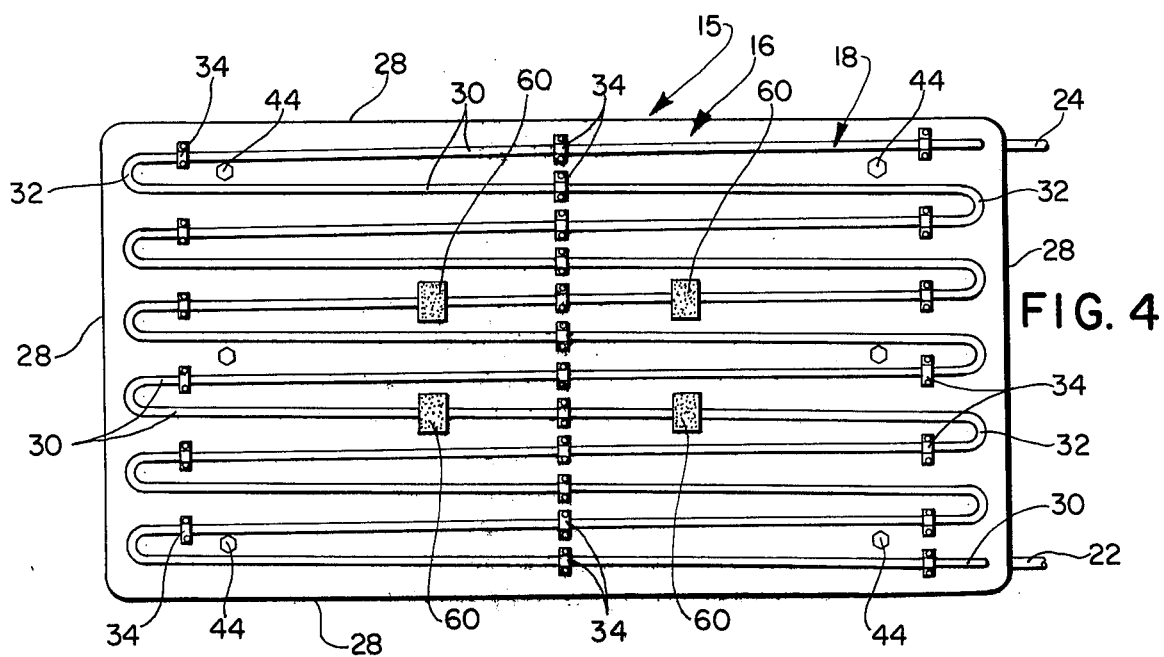
FIG. 4 is a plan view of an inverted heat pan of the solar collector shown in FIG. 1, but with the cover removed, and the pan removed from the roof for clearer illustration.

Pan 15, as may best be seen in FIGS. 2 and 4, includes the plate 16 having a flat upper face with co-planner edge portions and depending side walls 28 which extend around four sides of the rectangular plate 16. Continuous tube 18 is mounted on the upper face of the plate 16 and is in the form of a series of tube runs 30, adjacent runs being connected by return bends 32. Tube runs 30 are slightly inclined to each other and each run extends across the upper face of the plate 16 in a direction so that any moisture collecting on the upper face of the plate may flow downwardly and about the returns 32 to the bottom edge of the plate where it is discharged. Spacing between adjacent faces of adjacent runs at the returns 32 is preferably 2½ inches and at the open portion between adjacent runs approximately 3 inches for 4 foot runs and 3½ inches for 8 foot runs. Similarly, since the inlet 22 for the cold fluid to be heated is at the lower portion of the collector, as the fluid is heated it flows upwardly through the inclined tube runs 30 to the outlet 24, without use of a typical pump. Tube runs 30 are suitably secured to the plate 16 by straps, as 34, which may be riveted or otherwise suitably secured to the plate. By way of specific example, pan 15 is preferably 20 gauge zinc coated galvanized steel (G-90 coating G-steel) and the tube 18 may be ¾ inch seamless copper pipe, type L, with suitable copper straps 34. In order to prevent damage through electrolysis between the galvanized steel plate 16 and the copper tube 18, a lead strip 38 (FIG. 2) is provided between the plate and the tube.

The lower face of the collector plate 16 is provided with a suitable insulation 40 such as half inch thick styrofoam self extinguishing insulation which abuts the side walls 28 of the collector plate. Angle iron members 42 (only one shown in FIG. 2) are generally normal to the tube runs 30 and extend across the bottom face of the insulation 40 and are secured in place by nuts and bolts 44 extending through the plate 16 and preformed apertures in the upper flange of the angle member 42, the generally vertical flange having similar series of apertures for receiving a bolt 46 and accompanying nut for securing the legs, as 20, to the pan 15. In keeping with usual practice, the entire upper face of the pan 15, and the tube 18 is painted a flat black to better absorb solar energy.

Figure 3:
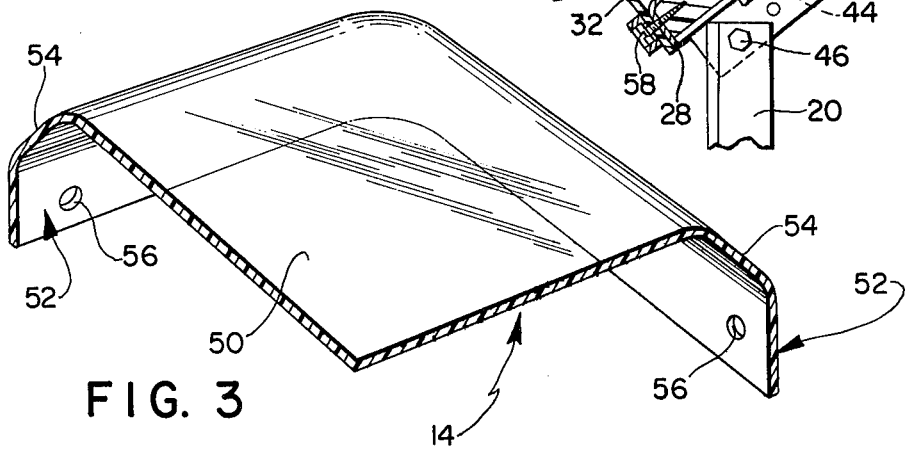
FIG. 3 is an enlarged, fragmentary, perspective view of the upper left hand corner of a transparent dome-shaped cover of the collector as shown in FIG. 1.

A fragmentary corner portion of the dome-shaped cover 14 is shown in FIG. 3. As illustrated, the cover 14 includes a generally flat top portion 50 and depending side walls 52 interconnected by beveled side edge portions 54 to permit better access of the sun's rays when the sun is relatively low in the sky. The bevel is about 135° to the top and side wall. Apertures 56 are provided in the side walls 52 for receiving sheet metal screws 58 and accompanying neuroprene washers (FIGS. 1 and 2) for securing the cover to the depending side walls 28 of the pan 15 with the screws embedded in the insulation 40 to retain the insulation in place until the angle members 42 are secured in place by the nuts and bolts 44. Cover 14 may be any suitable material but is preferably ⅛ inch thick plexiglas having a slow burn rate, as set forth by the National Bureau of Standards Work Report, March 1948, ASTM bulletin 151, the plexiglas having a self ignition point of approximately 860° F.

The depending side walls 52 of the cover 14 embrace the side walls 28 of the pan 15 and thus effectively prevent entry of precipitation, such as rain or snow, into the chamber between the top face of the plate 16 and the cover top 50. Additionally, no special sealing is required between the cover and the pan which permits maintaining substantially ambient pressure within the chamber through passage of air between the pan side walls 28 and the cover side walls 52, and this also permits discharge of moisture therebetween at the bottom edge of the collector.

In order to prevent excessive downward deflection of the cover top 50, resilient bumpers 60 (FIGS. 2 and 4) are generally semi-cylindrical and are suitable adhesively secured to tops of the tube runs 30 for engaging the top 50 of the cover should it be deflected downwardly.

While this invention has been described and illustrated with reference to a particular embodiment in a particular environment, various changes may be apparent to one skilled in the art and the invention is therefore not to be limited to such embodiment or environment, except as set forth in the appended claims.

What is claimed is:

1. A heat pan and tube type solar collector comprising, a heat plate of self-supporting, substantially rigid material having an upper face and peripheral edge portions substantially coplanar with said face, tube means extending along and fixed to said face in heat transfer relationship therewith for circulation through said tube means of a fluid to be heated; and a solar energy transmitting cover having a top spaced from and extending across said face and said tube means and having side means depending from said top to said peripheral edge portions of the plate for passage of solar energy through said top and side means of the cover to the heat plate and tube means, and means fixing said cover directly to said heat plate.

2. A solar collector as set forth in claim 1 in which the cover side means are substantially continuous and surround the peripheral edge portions of the heat plate.

3. A solar collector as set forth in claim 2 in which said cover is a substantially water tight, integral transparent dome.

4. A solar collector as set forth in claim 1 including resilient bumper means mounted on said tube means for preventing excessive deflection of said cover toward said plate.

5. A solar collector as set forth in claim 2 wherein said side means of said cover include side walls surrounding the heat plate and beveled portions extending at an obtuse angle to and between said top and side walls.

6. A solar collector as set forth in claim 1 in which said cover side means is fitted about said peripheral portions of the heat plate to permit passage of air therebetween and maintain substantially ambient pressure between the cover and the plate.

7. A solar collector as set forth in claim 1 wherein said means fixing said cover to said heat plate is releasable for convenient removal of the cover from the heat plate.

8. A solar collector as set forth in claim 2 in which said heat plate includes substantially continuous side walls transverse to said face and extending away from the face in a direction opposite said tube means, and said cover side means has substantially flat beveled edge means declining outwardly from said top, and the cover side means comprises a substantially continuous side wall fitted about the side walls of the heat plate for substantially preventing entry of precipitation between the plate and the cover while permitting passage of air to maintain substantially ambient pressure therein.

9. A solar collector as set forth in claim 1 in which said tube means includes an inlet proximate a bottom portion of the heat plate and an outlet proximate a top portion of the heat plate.

10. A solar collector as set forth in claim 1 wherein said heat plate is an inverted heat pan including a substantially continuous side wall, the heat pan being substantially rigid, and wherein there is further included insulation along a bottom face of the heat pan, and the pan side wall encircles a side edge portion of the insulation, and wherein said means fixing the cover to the heat plate include fasteners extending through the cover, the pan side wall and into the insulation to retain the plate, cover and insulation in assembly.

11. A solar collector as set forth in claim 10 including means for operatively supporting the unit, the last said means including members seated on a lower face of said insulation and fasteners securing the members to the plate.

12. A solar collector as set forth in claim 11 including resilient bumper means between said cover and said plate for preventing excessive deflection of said cover toward said plate, said bumper means being generally semi-cylindrical bumpers with inner semi-cylindrical faces mounted, one on each of spaced apart portions of said tube runs, and each with an outer semi-cylindrical face space from and in position to limit deflection of the cover top toward the heat pan sufficiently to avoid damage to the cover.

13. A solar collector unit comprising in combination, an inverted heat pan made of self-supporting, substantially rigid material having a face and side walls depending downwardly from the face generally at the periphery of the face, said heat pan including means forming conduits adjacent the face of the heat pan for conveying fluid to be heated, a solar energy transmitting cover having a top wall and a side wall depending from the top wall, and means fixing the side wall of the cover to the side walls of the heat pan with the top and side walls of the cover overlying and enclosing said face of the heat pan, and wherein said cover has angled portions extending between said top wall and the side wall and extending in planes at an obtuse angle relative to the plane of the top wall, said angled portions being located above the face of the heat pan at peripheral areas of the heat pan.

14. The heat collector defined in claim 13 further including insulation located on an underside portion of the heat pan opposite said face.

15. The solar collector defined in claim 14 further including a support member fixed to the underside of the heat pan with the insulation located between the support member and the heat pan, said support member being utilized for mounting the solar collector.

16. A solar collector as defined in claim 13 wherein the side wall of the cover extends at generally 90° relative to the top wall of the cover and wherein said beveled portions extend at an angle of approximately 135° to the side wall and top wall of the cover.

17. The solar collector defined in claim 13 wherein spaces between the side wall of the cover and the side wall of the heat pan are open to atmosphere for permitting ambient atmosphere to enter into the solar collector to equalize pressure.

18. The solar collector defined in claim 13 wherein said means forming conduits is tubing and wherein there is further included means anchoring the tubing to the face of the heat plate.

19. The solar collector as defined in claim 13 including means on the face of the heat pan and fixed relative to the face of the heat pan and underlying the top wall of the cover to be engageable with the cover for preventing excessive deflection of the cover towards said face of the heat pan.

20. A solar collector unit comprising in combination, an inverted heat pan made of self-supporting, substantially rigid material having a face and side walls depending downwardly from the face, said heat pan including means forming conduits adjacent the face of the heat pan for conveying fluid to be heated, a cover having a top wall and a side wall depending from the top wall, and means fixing the side wall of the cover to the side walls of the heat pan with the top and side walls of the cover overlying and enclosing said face of the heat pan, and wherein said conduit means include copper tubing and wherein there is further included lead strips located between the copper tubing and the face of the heat pan to prevent damage through electrolysis, the heat pan being made from galvanized steel.

21. The solar collector defined in claim 20 wherein said copper tubing extends in a serpentine fashion with the runs of the tubing extending at an angle to each other so as to permit any moisture collecting from the face of the heat plate to flow downwardly along the inclined runs of the copper tubing towards one end of the solar collector.

* * * * *